United States Patent

[11] 3,628,776

| [72] | Inventor | LeRoy J. Raseley<br>Saylorsburg, Pa. |
|------|----------|--------------------------------------|
| [21] | Appl. No. | 843,680 |
| [22] | Filed | July 22, 1969 |
| [45] | Patented | Dec. 21, 1971 |
| [73] | Assignee | Ingersoll-Rand Company<br>New York, N.Y. |

[54] COOLING TOWER FILL ASSEMBLY
10 Claims, 4 Drawing Figs.

[52] U.S. Cl. .................................................. 261/113,
261/DIG. 11
[51] Int. Cl. ...................................................... B01f 3/04
[50] Field of Search ........................................... 261/108,
109, 110, 111, 112, 113

[56] References Cited
UNITED STATES PATENTS

| 2,733,055 | 1/1956 | Ophuls et al. ............... | 261/113 X |
| 2,791,408 | 5/1957 | Lewis .......................... | 261/DIG. 11 |
| 3,063,688 | 11/1962 | Fordyce et al. .............. | 261/108 |
| 3,345,048 | 10/1967 | Phelps ........................ | 261/112 |
| 3,389,895 | 6/1968 | DeFlor ........................ | 261/DIG. 11 |
| 3,468,521 | 9/1969 | Furlong et al. .............. | 261/113 X |

*Primary Examiner*—Tim R. Miles
*Assistant Examiner*—Steven H. Markowitz
*Attorneys*—Carl R. Horten, David W. Tibbott and Frank S. Thomson ABSTRACT: A fill assembly for a cooling tower which includes a plurality of parallel, spaced-apart, superimposed support members on which are mounted a plurality of trays. The support members are at an angle but each of the trays are mounted so that they are generally horizontal. The trays are provided with holes therethrough to permit water to gravitate through the fill assembly. Air flows through the fill assembly between the trays to cool the water.

PATENTED DEC 21 1971
3,628,776
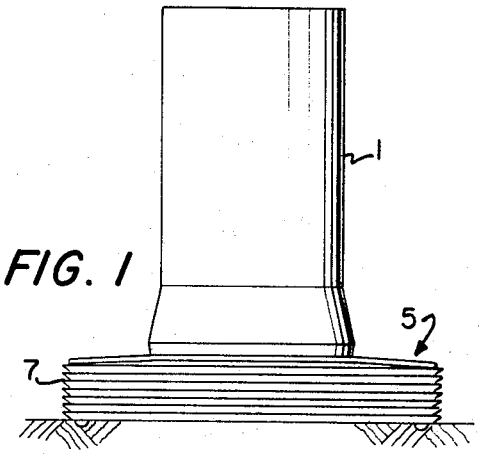
FIG. 1
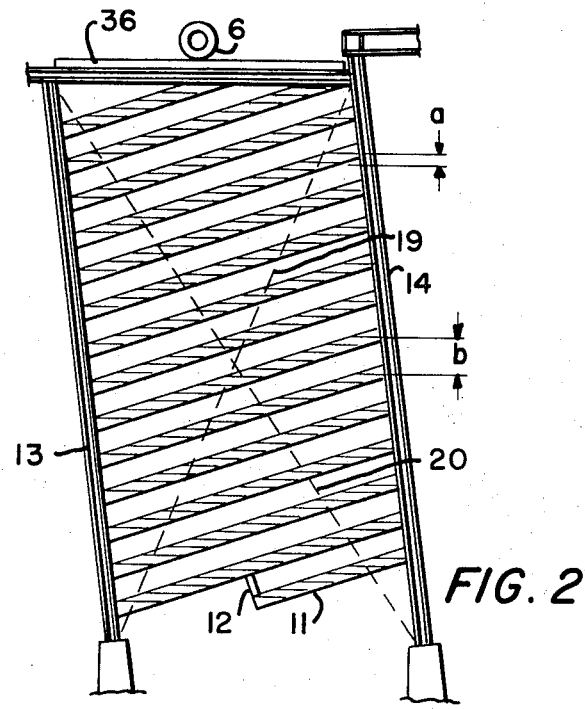
FIG. 2
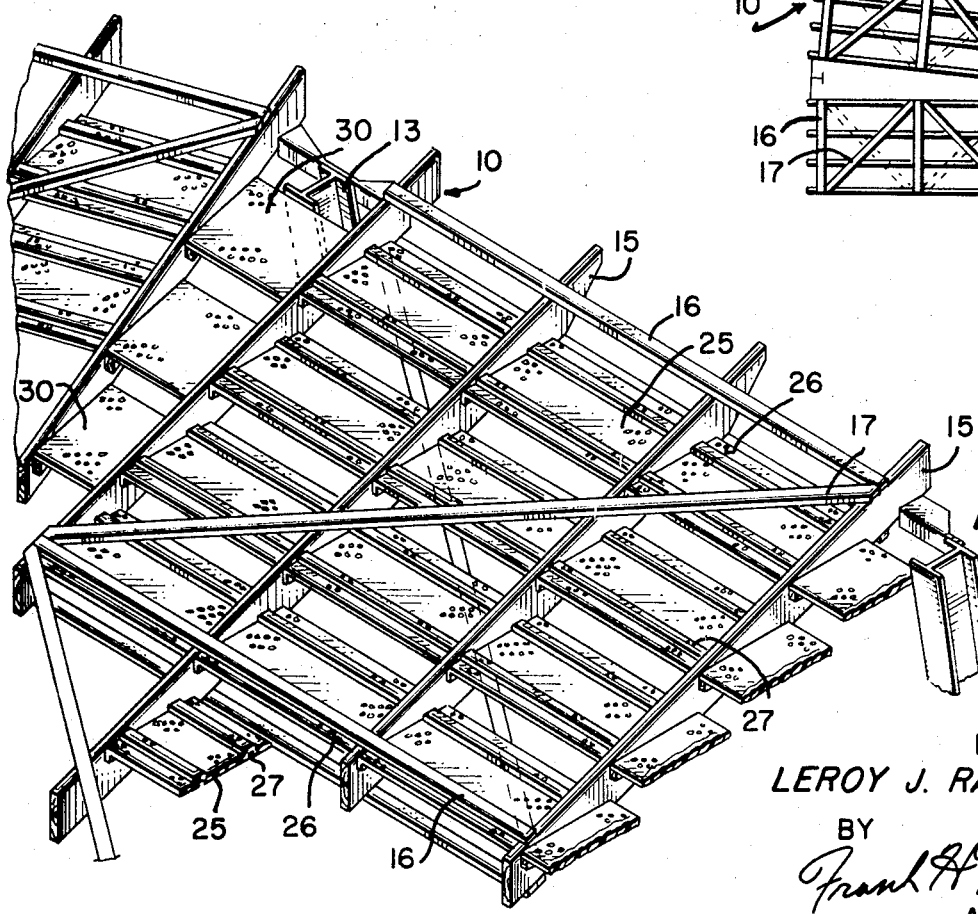
FIG. 4
FIG. 3
INVENTOR
LEROY J. RASELEY
BY
Frank H. Thomson
ATTORNEY

COOLING TOWER FILL ASSEMBLY

BACKGROUND OF THE INVENTION

This invention relates to cooling towers and in particular to a fill assembly for a crossflow cooling tower.

Prior to the present invention, most crossflow fill assemblies were constructed from a network of stacked bars which are known as splash bars. As water to be cooled gravitates through the cooling tower, its path is interrupted by the water striking the splash bar. The splashing breaks the falling water into drops and increases the length of time the water is in the fill assembly and hence the length of time the water is exposed to air which flows through the cooling tower.

One disadvantage of splash bar fill assemblies is that they are usually constructed from wood and hence even though treated, they tend to rot after a period of time. An additional disadvantage of conventional splash bar fill assemblies is that to be effective, the splash bars must be closely spaced and this close spacing tends to inhibit the flow of air through the fill assembly.

Attempts have been made to replace splash bar fill assemblies with a tray-type fill assembly. In a tray-type assembly, there are a plurality of spaced-apart trays or panels each having a plurality of holes therethrough. In this type of fill assembly, the water is broken into drops by passing through the holes in the trays as opposed to the splashing produced by the splash bar arrangement. Many of the attempts to use trays have failed because the trays become so large that they are unable to support themselves. In addition, it has not always been possible to place the trays so that there is sufficient interruption of the flow of water through the fill assembly while permitting an adequate flow of air through the cooling tower.

SUMMARY

It is therefore the principal object of this invention to provide a novel fill assembly for a cooling tower which insures adequate cooling of water and is economical to manufacture.

It is further object of this invention to provide a fill assembly for a cooling tower which permits the water to be cooled to remain in the fill assembly for a length of time sufficient to accomplish an adequate temperature drop of the water to be cooled.

It is a still further object of this invention to provide a novel fill assembly for a cooling tower which permits free flow of air through the fill assembly while allowing the water to be cooled to remain in the fill assembly for a time sufficient to accomplish the desired cooling function.

In general, these and other objects will be carried out by providing in combination with a cooling tower, a fill assembly through which water to be cooled is adapted to gravitate and air is adapted to flow comprising: a plurality of parallel, spaced-apart, superimposed support members; means for mounting said support members within said cooling tower so that said support members are at angle to horizontal; and tray means mounted on each of said support members; said tray means being provided with a plurality of holes therethrough or permitting water which gravitates through the fill assembly to pass through the tray means.

BRIEF DESCRIPTION OF THE DRAWING

The invention will be described in connection with the annexed drawings wherein:

FIG. 1 is a generally schematic view of a natural draft cooling tower with which the fill assembly of the present invention may be used;

FIG. 2 is an elevational view of a portion of a fill assembly constructed in accordance with the present invention;

FIG. 3 is a perspective view of the fill assembly of the present invention; and

FIg. 4 is a top plan view of a portion of the fill assembly of the present invention.

DESCRIPTION OF THE PREFERRED EMBODIMENT

In Fig. 1 a natural draft cooling tower is shown and includes a stack 1. A fill assembly, generally indicated at 5, surrounds the stack. Water is supplied through suitable piping 6 to the top of the fill assembly. Air flows through open louvers 7 into the stack in a well-known manner to cool the water as at gravitates through the fill assembly.

Referring to FIGS. 2, 3 and 4, general arrangement of the fill assembly will be seen. A plurality of parallel, spaced-apart, superimposed support or lattice members 10 are suspended from beams 13 and 14 so that they are at an angle to the horizontal. Each lattice 10 includes a number of parallel ribs 15 and cross ribs 16 and 17. The bottom support member 11 secured at one end to the beam 14 nd its other end to an adjacent support member 10 by means of a bar 12. For additional strength crossbeams 19 and 20 may be added to a fill assembly.

A plurality of trays or panels 25 are mounted on each of the support members 10 so that they are horizontal. The trays or panels are best shown in FIG. 3 and are provided with a plurality of holes 26 therethrough. The panels 25 may be any suitable material but are preferably constructed from a noncorrosive material such as plastic. Although the panels are not required to withstand any substantial load, they may be provided with strengthing ribs 27 to insure that they will be able to support their own weight.

As will be seen in FIG. 3, the trays are positioned between members 15 of the lattice structure 10. With the cooling tower shown, the fill assembly is circular in configuration. The lattice members 10 are positioned to form a circle. Trays 30 are mounted between adjacent lattice members so that a direct path from the top of the fill assembly to the bottom is not provided.

During operation of the cooling tower, water to be cooled will enter the fill assembly through suitable piping 6. From the pipe 6, the water will flow onto a distribution panel 36 which is provided with a plurality of holes therethrough. The water will gravitate through the fill assembly striking the various panels or trays 25 in its descent. After striking a tray 25, the water will either flow through the holes in the tray to the next lower tray or splash off the tray and fall to the next lower tray. Hence, with the present arrangement, the water is broken up into drops by both splashing and by passing through holes in trays. Thus the splashing achieved by the splash bar fill assembly is retained as are the construction advantages of the tray-type fill assembly. Air flows through the fill assembly, from left to right in fig. 2, contacts the drops and thereby cools the water. Eventually, the water reaches the bottom of the fill assembly which is provided with a collection basin (not shown).

With the panels 25 mounted in a stepped manner, as shown in figs. 2 and 3, air for cooling the water is free to flow through the cooling tower. The angle at which the lattice members 10 are mounted can be varied although it is believed that the various lattice members should be parallel to each other. As the angle between horizontal and the lattice members is increased with the trays 25 remaining horizontal, the ability of air to flow through the fill assembly will be increased. However, as the angle between the horizontal and the lattice member increases, if the same number of trays 25 are used, the distance between the trays on one lattice member and trays on the lattice member below also increases thereby increasing the distance between interruptions to the fall of water through the fill assembly. This results in a decreased amount of time during which the water is exposed to the flow of air through the fill assembly thus, to some degree, offsetting the advantages gained through the better airflow pattern established by increasing the slope of the lattice members. The slope of the lattice members must therefore be established which balances these two factors.

Other factors which will affect the efficiency of the fill assembly of the present invention include the width of the trays, the vertical distance between trays on the same lattice member 10 and the FIG. distance between lattice members. In one unit, the lattice members are positioned so they were at a slope of approximately 0.35. Trays having a width of 24 inches were placed on the lattice members so that the vertical distance, a in fig. 2, between trays on the same lattice member was 8 inches. The vertical distance b in fig. 2, between trays on adjacent lattice members was 32 inches. The desired temperature drop of the water was achieved using this arrangement. Other dimensional configurations may be used and those outlined above are not intended to limit the invention.

In the preferred form of the invention, the fill assembly is slanted toward the inside of the cooling tower when proceeding from the top of the assembly towards the bottom. This should be readily apparent from fig. 2. Preferably, the trays are mounted on the lattice members so that the ends of one tray are in line with or slightly overlie the ends of the adjacent trays on the same lattice member. This insures that the water will splash from tray to tray.

Although the fill assembly has been illustrated with the lattice members angled so that the lower end is at the outside of the fill assembly, it should be understood that they may be angled in the opposite direction so that the lower end is at the inside.

It should be apparent that the object of this invention has been carried out. An economical fill assembly for a cooling tower has been provided. It employs the advantages of both the splash bar-type fill assembly and the tray-type fill assembly. The arrangement permits a free flow of air through the fill assembly while providing a sufficient number of interruptions to insure that the water remains in the fill assembly to be cooled the desired amount.

I claim:

1. In combination with a cooling tower, a fill assembly through which water to be cooled is adopted to gravitate and air is adapted to flow comprising;

a plurality of parallel, spaced-apart superimposed support members;

means for mounting said support members within said cooling tower so that said support members are at an angle to horizontal; and tray means mounted on each of said support members; said tray means being arranged in steplike pattern and positioned substantially horizontally provided with a plurality of holes therethrough for permitting water which gravitates through the fill assembly to pass through the tray means.

2. The combination of claim 1 wherein said tray means are substantially horizontally mounted on said support members.

3. The combination of claim 2 wherein said tray means includes a plurality of panels, each of said panels being vertically and horizontally spaced from the adjacent panels.

4. The combination of claim 3 wherein the ends of each panel overlies the end of the adjacent panels.

5. The combination of claim 4 wherein each of said support embers is a latticelike structure including a plurality of rib members and said panels are mounted between said rib members.

6. In combination, with a cooling tower, a fill assembly through which water to be cooled is adapted to gravitate and air is adapted to flow to cool said water comprising;

a plurality of inclined lattice members;

means for mounting said lattice members in said cooling tower, and a plurality of panels horizontally mounted on each of said lattice members in a steplike pattern;

each of said panels having a plurality of holes therethrough to permit water to be cooled to gravitate through the fill assembly.

7. The combination of claim 6 wherein the ends of each of said panels overlie an end of the adjacent panels.

8. The combination of claim 6 wherein said lattice members are inclined downwardly toward the outer periphery of the cooling tower and the panels are stepped upwardly away from the outer periphery of the cooling tower.

9. The combination of claim 8 wherein said lattice members are vertically spaced apart.

10. The combination of claim 9 wherein the panel members on each of said lattice members are displaced slightly inwardly from the outer periphery of the cooling tower from the panels of the lattice member immediately above.

* * * * *